(12) United States Patent
Chaleff (10) Patent No.: US 9,625,709 B1
(45) Date of Patent: Apr. 18, 2017

(54) REDUCED WINDAGE PRISMATIC POLYGONAL REFLECTOR FOR SCANNING

(71) Applicant: DATALOGIC AUTOMATION, INC., Telford, PA (US)

(72) Inventor: Edward Chaleff, Doylestown, PA (US)

(73) Assignee: Datalogic USA, Inc., Eugene, OR (US)

( * ) Notice: Subject to any disclaimer, the term of this patent is extended or adjusted under 35 U.S.C. 154(b) by 0 days.

(21) Appl. No.: 14/869,484

(22) Filed: Sep. 29, 2015

(51) Int. Cl.
*G02B 26/12* (2006.01)

(52) U.S. Cl.
CPC .................................... *G02B 26/12* (2013.01)

(58) Field of Classification Search
CPC ............. G02B 5/09; G02B 5/10; G02B 26/12
USPC .......................................... 359/216.1–219.2
See application file for complete search history.

(56) References Cited

U.S. PATENT DOCUMENTS

| | | | | |
|---|---|---|---|---|
| 4,875,748 A | * | 10/1989 | Matsumoto | G02B 5/09 359/218.1 |
| 5,024,496 A | * | 6/1991 | Oikawa | G02B 5/09 359/218.1 |
| 5,039,184 A | | 8/1991 | Murakawa et al. | |
| 5,046,797 A | * | 9/1991 | Kurisu | G02B 27/0006 359/196.1 |
| 5,142,404 A | * | 8/1992 | Shiraishi | G02B 5/09 250/236 |
| 5,161,047 A | * | 11/1992 | Tomita | G02B 5/09 250/234 |
| 5,170,278 A | * | 12/1992 | Wada | G02B 5/09 359/212.1 |
| 5,239,403 A | * | 8/1993 | Shiraishi | G02B 26/121 250/236 |
| 5,268,565 A | | 12/1993 | Katoh et al. | |
| 5,293,266 A | * | 3/1994 | Kohsaka | G02B 26/121 310/51 |
| 5,296,959 A | * | 3/1994 | Asai | B29C 45/26 359/216.1 |
| 5,675,430 A | * | 10/1997 | Ishizuka | B22F 1/0003 359/216.1 |
| 6,390,369 B1 | | 5/2002 | Tang et al. | |
| 6,427,916 B1 | * | 8/2002 | Ishii | G02B 5/09 235/462.39 |
| 6,786,413 B2 | * | 9/2004 | Gurevich | G02B 5/09 235/462.21 |
| 7,073,716 B2 | | 7/2006 | Hammer | |
| 8,184,353 B2 | | 5/2012 | Kakino et al. | |
| 2004/0184127 A1 | * | 9/2004 | Nakajima | G02B 26/123 359/204.1 |

(Continued)

*Primary Examiner* — Frank Font
(74) *Attorney, Agent, or Firm* — Shook, Hardy & Bacon L.L.P.

(57) ABSTRACT

An improved prismatic polygonal reflector with increased aerodynamic properties and reduced scattering of reflected light is provided. The reflector may be used for scanning, and may include a first end, a second end, a plurality of side surfaces located circumferentially about a center axis of the reflector, and a plurality of intersections joining the plurality of side surfaces. Each of the plurality of intersections includes a curved or a flat portion and a pointed portion aligned circumferentially with other pointed portions on the plurality of intersections to provide a circumference around the reflector for light to reflect and form a scanning beam without light scattering. A system and method for scanning with the reflector is also provided.

18 Claims, 8 Drawing Sheets

(56) References Cited

U.S. PATENT DOCUMENTS

| | | | | |
|---|---|---|---|---|
| 2012/0170053 A1* | 7/2012 | Krakenes | ............... | G01B 11/25 |
| | | | | 356/612 |
| 2013/0076857 A1* | 3/2013 | Kurashige | .............. | G01B 11/25 |
| | | | | 348/40 |
| 2014/0009555 A1* | 1/2014 | Itami | ...................... | G02B 26/12 |
| | | | | 347/261 |
| 2015/0092256 A1* | 4/2015 | Ono | .................... | F16D 65/0006 |
| | | | | 359/200.7 |
| 2015/0248077 A1* | 9/2015 | Hoshino | .......... | G03G 15/04036 |
| | | | | 399/216 |

* cited by examiner

REDUCED WINDAGE PRISMATIC POLYGONAL REFLECTOR FOR SCANNING

TECHNICAL FIELD

The field of the invention relates to scanners and related components, and more specifically, to reflectors used with scanners.

BACKGROUND

A scanning device often incorporates multiple components that work together to generate a beam of light for scanning. These components may include a light emitting component and a reflector that together generate a scanning beam. The scanning beam may, for example, be used for dimensional or barcode scanning.

In certain designs, the reflector may include multiple sides, and may rotate so that light from the light emitting component is reflected from each side of the reflector in succession during operation of the scanner. Rotational operation of the reflector may cause wind drag and thermal friction from air moving over the spinning reflector, and also notably, light scattering, or rather, scattered light in portions of the beam from light reflected off of intersections between surfaces of the reflector. This may affect the accuracy of scanning and the ability to place scanners in close proximity to each other. Accordingly, an improved reflector that addresses these issues, among others, is needed.

SUMMARY

This summary is provided to introduce a selection of concepts in a simplified form that are further described below in the detailed description section of this disclosure. This summary is not intended to identify key or essential features of the claimed subject matter, nor is it intended to be used as an aid in determining the scope of the claimed subject matter. The scope of the invention is defined by the claims.

In brief, and at a high level, this disclosure describes, among other things, a prismatic polygonal reflector that can be used for generating a beam of light for a scanner. The design of the reflector disclosed herein may improve aerodynamic performance and also reduce scattering of light during operation of the scanner. An exemplary polygonal reflector includes first and second ends and a plurality of side surfaces located circumferentially around a center axis of the reflector. The side surfaces are joined together at intersections. A portion of each intersection may include a flat, curved, and/or otherwise aerodynamically formed portion that reduces aerodynamic drag when the reflector is in operation and spinning. Additionally, each of the intersections may include a pointed portion that helps provide a reduction in scattered light from the reflector when light passes from one side surface of the reflector to another side surface across an intersection.

In a first embodiment of the invention, a polygonal reflector is provided. The reflector comprises a first end located perpendicular to a plurality of side surfaces, a second end located opposite to the first end and located perpendicular to the plurality of side surfaces, the plurality of side surfaces located circumferentially about a center axis of the reflector, and a plurality of intersections joining the plurality of side surfaces, where each of the plurality of intersections includes a curved or a flat portion, and a pointed portion aligned circumferentially with other pointed portions on the plurality of intersections.

In a second embodiment of the invention, a scanning system is provided. The system comprises a light emitting component and a polygonal reflector comprising a first end located perpendicular to a plurality of side surfaces, a second end located opposite to the first end and located perpendicular to the plurality of side surfaces, the plurality of side surfaces located circumferentially about a center axis of the reflector, and a plurality of intersections joining the plurality of side surfaces. Additionally, each of the plurality of intersections includes a curved or a flat portion, and a pointed portion aligned circumferentially with other pointed portions on the plurality of intersections. Further, when light is emitted from the light emitting component and directed towards the reflector, and when the reflector is rotating about the center axis, the light is reflected from each of the plurality of side surfaces and each of the circumferentially aligned pointed portions, forming a scanning beam.

In a third embodiment of the invention, a method for reduced-interference scanning is provided. The method comprises providing a first light emitting component, providing a polygonal reflector comprising a first end located perpendicular to a plurality of side surfaces, a second end located opposite to the first end and located perpendicular to the plurality of side surfaces, the plurality of side surfaces located circumferentially about a center axis of the reflector, and a plurality of intersections joining the plurality of side surfaces, where each of the plurality of intersections includes a curved or a flat portion and a pointed portion aligned circumferentially with other pointed portions on the plurality of intersections. The method further comprises spinning the reflector about the center axis, and directing light from the light emitting component towards the reflector such that the light is reflected from each of the plurality of side surfaces and the circumferentially aligned pointed portions to form a scanning beam.

The reflector described in this disclosure is frequently discussed in the context of dimensional and barcode scanners and scanning. However, the reflector may be incorporated and used for any type of scanning done with a beam of light or a laser. Such variations are possible and contemplated.

As described in this disclosure, the term "prismatic" refers to an object that relates to, resembles, or constitutes a prism. A prism may be defined as an object having parallel bases or ends that are the same size and/or shape, and side surfaces that are parallelograms. The term "polygonal" refers to an object that has side and end surfaces which are each a closed plane or figure having three or more sides.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of the invention. Rather, the claimed subject matter might be embodied in other ways, to include different steps or combinations of steps similar to the ones described in this document, and in conjunction with other present or future technologies. Moreover, although the terms "step" or "block" may be used herein to connote different elements of various methods employed, the terms should not be interpreted as implying any particular order among or between various steps or blocks unless and except the order of individual steps or blocks is explicitly described or required.

At a high level, the present invention generally relates to a prismatic polygonal reflector that provides improved aerodynamic properties and reduced scattering of reflected light. More specifically, the polygonal reflector may include a plurality of at least partially reflective side surfaces that form a polygonal prism, with a plurality of intersections providing transitions between adjacent side surfaces on the reflector. At least a portion of each intersection may be aerodynamically formed with a curved or a flat surface, to reduce air drag over the intersection when the reflector is spinning.

Additionally, at least part of the intersection may include a pointed portion that extends directly adjacent side surfaces of the reflector to a point, or a distal end. At least some of the pointed portions may be aligned circumferentially around the reflector, so that at a particular axial position between the first end and the second end of the reflector, the pointed portions circumscribe the reflector, with at least one pointed portion positioned on each intersection at the axial position. As a result, a less-scattered reflection of light is possible at each intersection at the axial position, which produces a more concentrated beam of light for scanning, while maintaining improved aerodynamic properties of the reflector due to the placement of the flat or curved portions on the intersection.

Figure 1:
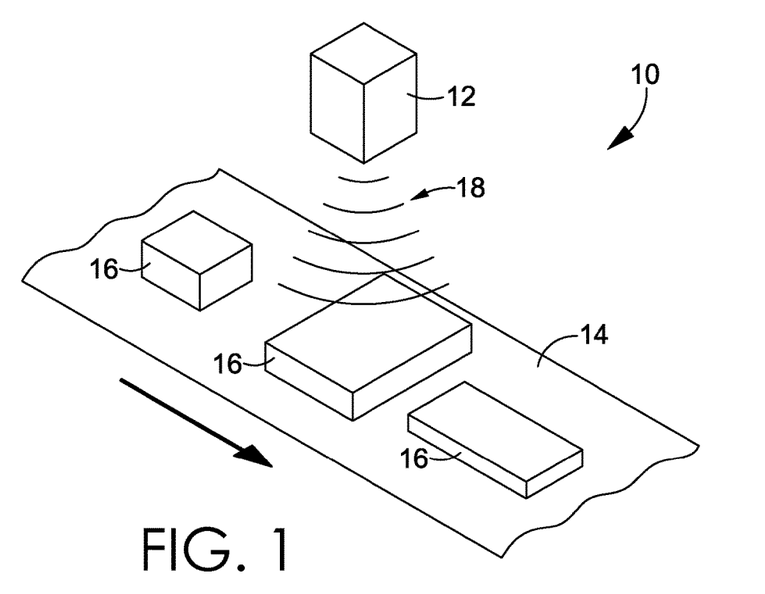
FIG. 1 is an exemplary scanning system utilizing a single scanner, in accordance with an embodiment of the present invention.

Referring now to FIG. 1, an exemplary scanning system 10 utilizing a scanner 12 is provided, in accordance with an embodiment of the present invention. In FIG. 1, the scanner 12 is shown positioned over a conveyer 14 on which packages 16 are moving relative to the scanner 12. The scanner 12, shown in FIG. 1, may be a dimensional scanner, and accordingly, a beam of light 18, emitted by the scanner 12 and directed at the different packages 16 of different sizes on the conveyer 14, may be used to provide dimensional scanning information for the packages 16.

Figure 2:
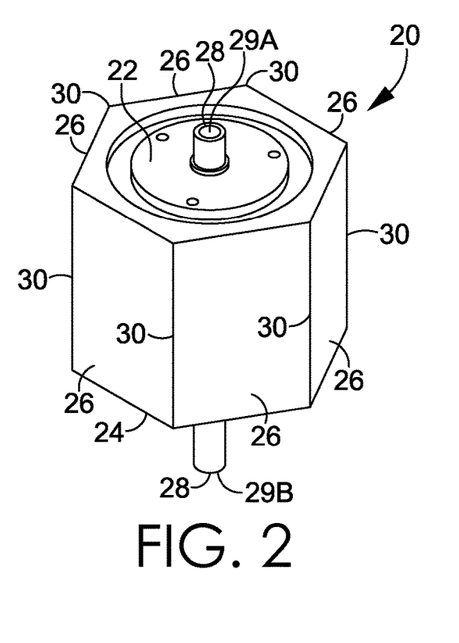
FIG. 2 is an exemplary prismatic polygonal reflector, in accordance with an embodiment of the present invention.

Referring now to FIG. 2, an exemplary prismatic polygonal reflector 20 is provided, in accordance with an embodiment of the present invention. In FIG. 2, the reflector 20 includes a first end 22 and an opposite second end 24, and a plurality of side surfaces 26 positioned circumferentially about a center axis 28 of the reflector 20. The reflector 20 further includes a plurality of intersections 30 that are sharply pointed, such that they may provide a reflection of light over the intersections 30 with reduced light scattering when the reflector 20 is rotating and reflecting emitted light into a beam of light, such as the beam of light 18 shown in FIG. 1, for scanning. As demonstrated in FIG. 2, the reflector 20 includes multiple side surfaces 26 that connect together with each other and with the first end 22 and the second end 24 of the reflector 20 to form a polygonal prism. Furthermore, each of the side surfaces 26 in FIG. 2 is rectangular.

The reflector 20 in FIG. 2 is shown having a first mount 29A at the first end 22 and a second mount 29B at the second end 24. The mounts 29A, 29B provide mateable connections for a device or machine which couples to and spins the reflector 20, to expose at least a portion of each of the side surfaces 26 and the intersections 30 to emitted light directed at the reflector 20 from a light source. Such a connection may, for example, utilize a magnetic coupling or a ball bearing coupling, or another mechanical coupling for providing translation of rotational force to the reflector 20.

Figure 3:
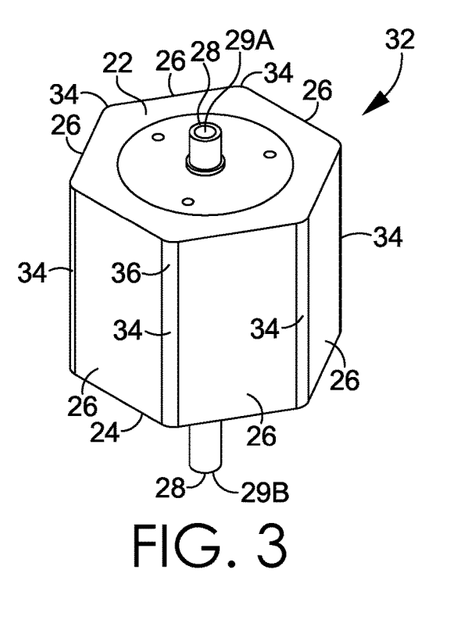
FIG. 3 is an exemplary prismatic polygonal reflector with aerodynamically formed intersections, in accordance with an embodiment of the present invention.

Referring now to FIG. 3, an exemplary prismatic polygonal reflector 32 with aerodynamic intersections 34 is provided, in accordance with an embodiment of the present invention. In FIG. 3, the reflector 32 includes the side surfaces 26 shown in FIG. 2, however, the aerodynamic intersections 34 are additionally formed or machined to include aerodynamic contours 36 that allow a smoother and more aerodynamic transition of air over the intersections 30 when the reflector 32 is spinning. This reduces drag and thermal variation caused by friction from the air moving over the reflector 32.

The aerodynamic contours 36 may be any shape or configuration that improves the transition of air over the aerodynamic intersections 34 compared to the intersections 30 shown in FIG. 2. In this regard, the aerodynamic contours 36 may be curved, flat, partially curved and/or flat, symmetric or asymmetric, and/or otherwise formed or shaped to help smooth the transition of air over the aerodynamic intersections 34, to improve the efficiency and performance of the reflector 32 when it is spinning about the center axis 28.

Figures 4A, 4B:
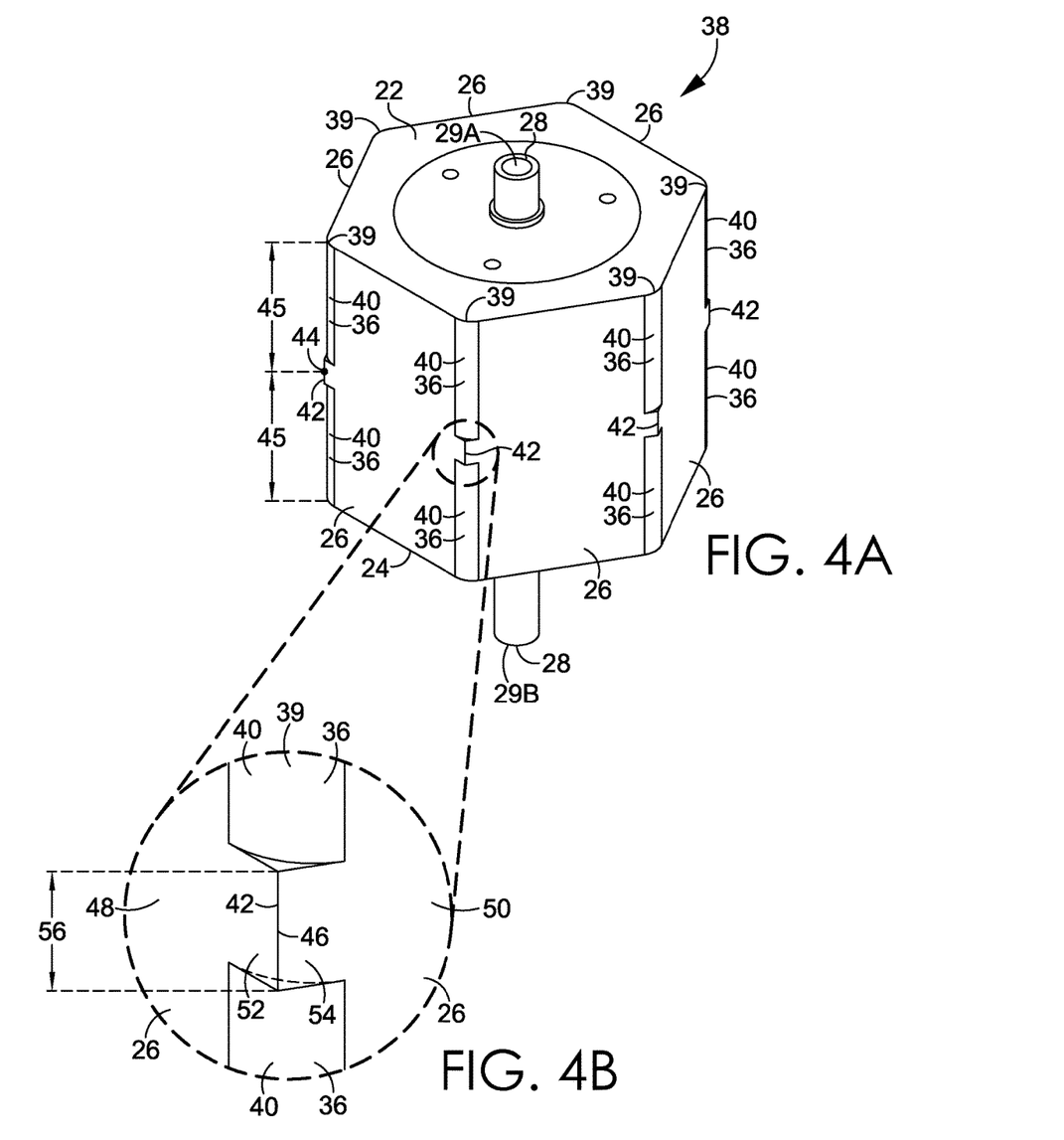
FIG. 4A is an exemplary prismatic polygonal reflector with intersections having aerodynamically formed portions and a pointed portion for reduced scattering of reflected light from the intersections, in accordance with an embodiment of the present invention.
FIG. 4B is a partial, enlarged view of the pointed portion shown in FIG. 4A, in accordance with an embodiment of the present invention.

Referring now to FIG. 4A, an exemplary prismatic polygonal reflector 38 with intersections 39 having aerodynamically formed portions 40 and also pointed portions 42 for improved reflectivity of light is provided, in accordance with an embodiment of the present invention. In FIG. 4A, the reflector 38 includes the side surfaces 26 shown in FIGS. 1-3, but further includes intersections 39 having aerodynamically formed portions 40 that include the aerodynamic contours 36 discussed in relation to FIG. 3. The intersections 39 connect side surfaces 26 around the circumference of the reflector 38. The intersections 39 on the back side of the reflector 38 in FIG. 4A are not fully visible, but may be similar or identically formed, shaped, and/or spaced compared to the intersections 39 shown on the front, or visible, side of the reflector 38.

As shown in FIG. 4A, each of the intersections 39 includes a pointed portion 42 at an axial position 44 that is the same as the other intersections 39 (including on the back side of the reflector 38). Additionally, in FIG. 4A, the axial position 44 is an equal distance 45 from the respective first and second ends 22, 24 of the reflector 38. In this regard, the pointed portions 42, or at least some of the pointed portions 42 if multiple pointed portions 42 are included on each intersection 39, are placed circumferentially around the reflector 38 on the intersections 39 at the axial position 44 (or any other axial position), such that at the axial position 44, a continuous circumference exists around the reflector 38 that crosses the side surfaces 26 and the pointed portions 42, while minimally crossing the aerodynamically formed portions 40 (or not crossing them at all) to reduce scattering of light. It should be noted that the pointed portions 42 may be positioned at any axial position between the first end and the second end of the reflector 38, and accordingly, the axial position 44 shown in FIG. 4A is merely exemplary.

Furthermore, the aerodynamically formed portions 40 in FIG. 4A extend from the first end 22 to the pointed portion 42 of each respective intersection 39, and from the second end 24 to the pointed portion 42 of each respective intersection 39. The pointed portion 42 may be any desired length or size along the intersection 39, although a shorter length and size may allow improved aerodynamics while still reducing the scattering of light. Multiple or different size pointed portions 42 may be used on one or more intersections 39, or within the same intersection 39, to provide variation to the location and/or size of the reflected beam of light, as desired.

Referring now to FIG. 4B, a partial, enlarged view of the pointed portion 42 shown on the reflector 38 in FIG. 4A is provided, in accordance with an embodiment of the present invention. In FIG. 4B, the pointed portion 42 is generally extruded radially from the intersection 39, or rather, extends to a distal end 46 at the intersection 39. The pointed portion 42 is less aerodynamic, or rather, provides a less transitional change in direction between a first side surface 48 and a second side surface 50 of the reflector 38.

Additionally, in FIG. 4B, the pointed portion 42 is shown with a first side 52 that is generally coplanar with the first side surface 48 (to provide continuous and less scattered reflection of light up to the distal end 46), and a second side 54 which is generally coplanar with the second side surface 50 (to provide continuous and less scattered reflection of light up to the distal end 46). A length 56 of the pointed portion 42 may be selected as needed to provide a proper beam width, and the remaining portions of the intersections 39 may otherwise be the aerodynamically formed portions 40 which improve aerodynamic efficiency of the reflector 38. Additionally, the length 56 of the pointed portion 42 may correlate to beam width, or rather, as length 56 increases, the width of the beam produced from the reflector 38 may be increased with reduced light interference, as described herein. Similarly, increasing the distance between pointed portions 42 on the reflector 38 (i.e., increasing width of the side surfaces 26) may be used to increase the length of the scanning beam from end to end.

Figure 5:
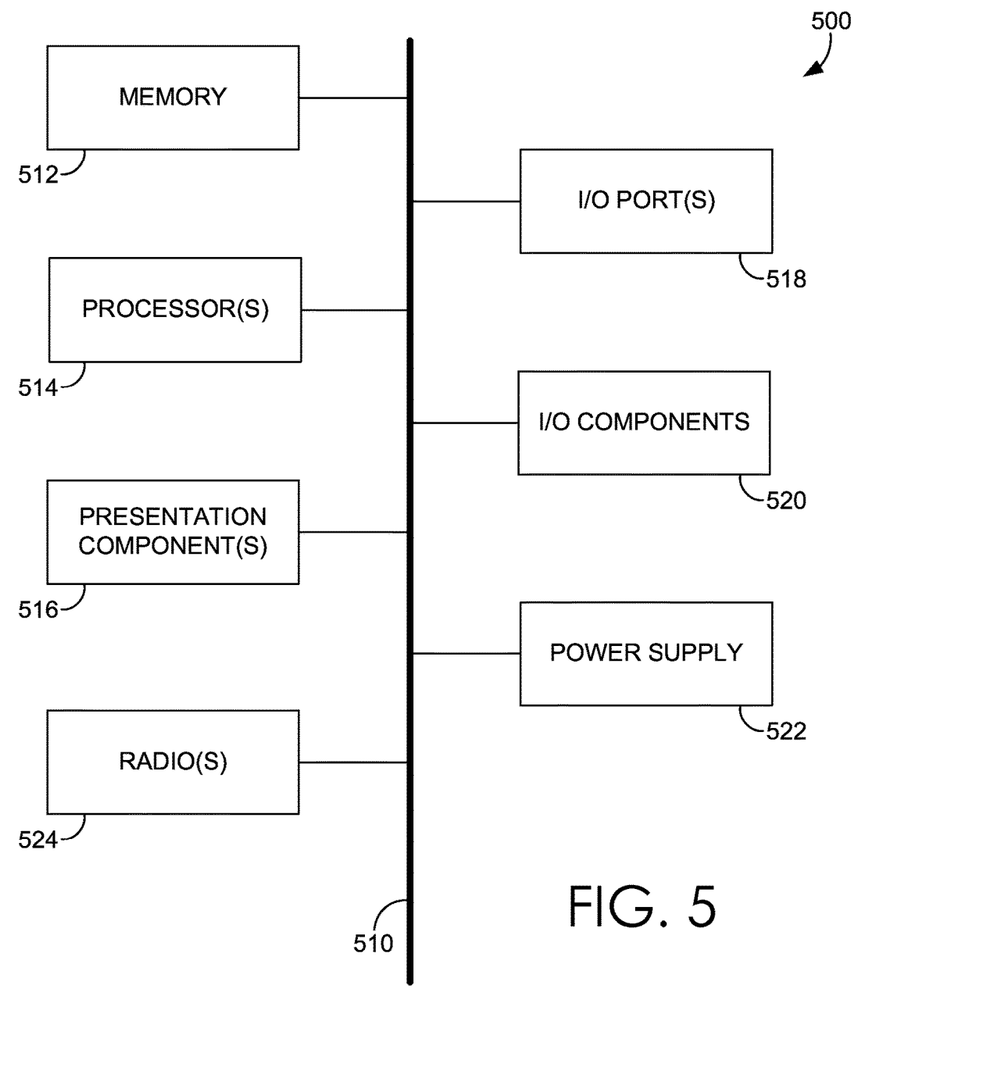
FIG. 5 is an exemplary computing environment which may be used with a scanner incorporating a prismatic polygonal reflector, in accordance with an embodiment of the present invention.

Referring now to FIG. 5, an exemplary operating environment which can be used for implementing embodiments described herein is shown and designated generally as computing device 500. Computing device 500 is but one example of a suitable computing environment and is not intended to suggest any limitation as to the scope of use or functionality of the invention. The computing device 500 should not be interpreted as having any dependency or requirement relating to any one or a combination of components illustrated.

In FIG. 5, computing device 500 includes a bus 510 that directly or indirectly couples the following devices: memory 512, one or more processors 514, one or more presentation components 516, input/output ports 518, input/output components 520, and an illustrative power supply 522. Bus 510 represents what may be one or more busses (such as an address bus, data bus, or a combination thereof). Although the various blocks of FIG. 5 are shown with lines for the sake of clarity, in reality, delineating various components is not as clear, and metaphorically, the lines are blurred. For example, one may consider a presentation component such as a display device to be an I/O component. Also, processors have memory. The diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated as within the scope of FIG. 5 and when referencing the "computing device."

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in any variety of system configurations, including hand-held devices, consumer electronics, general-purpose computers, and more specialty computing devices, among others. The invention may also be practiced in distributed computing environments where tasks are performed by remote-processing devices that are linked through a communications network.

Computing device 500 may include a variety of computer-readable media and/or computer storage media. Computer-readable media may be any available media that can be accessed by computing device 500 and includes both volatile and non-volatile media, removable and non-removable media. By way of example and not limitation, computer-readable media may comprise computer storage media and communication media and/or devices. Computer storage media may include volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. These memory components can store data momentarily, temporarily, or permanently. Computer storage media does not include signals per se.

Communication media typically embodies computer-readable instructions, data structures, or program modules. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 512 includes computer storage media in the form of volatile and/or non-volatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc. I/O ports 518 allow computing device 500 to be logically coupled to other devices including I/O components 520, some of which may be built-in. Illustrative components include a microphone, joystick, game pad, satellite dish, scanner, printer, wireless device, and the like.

Figure 6:
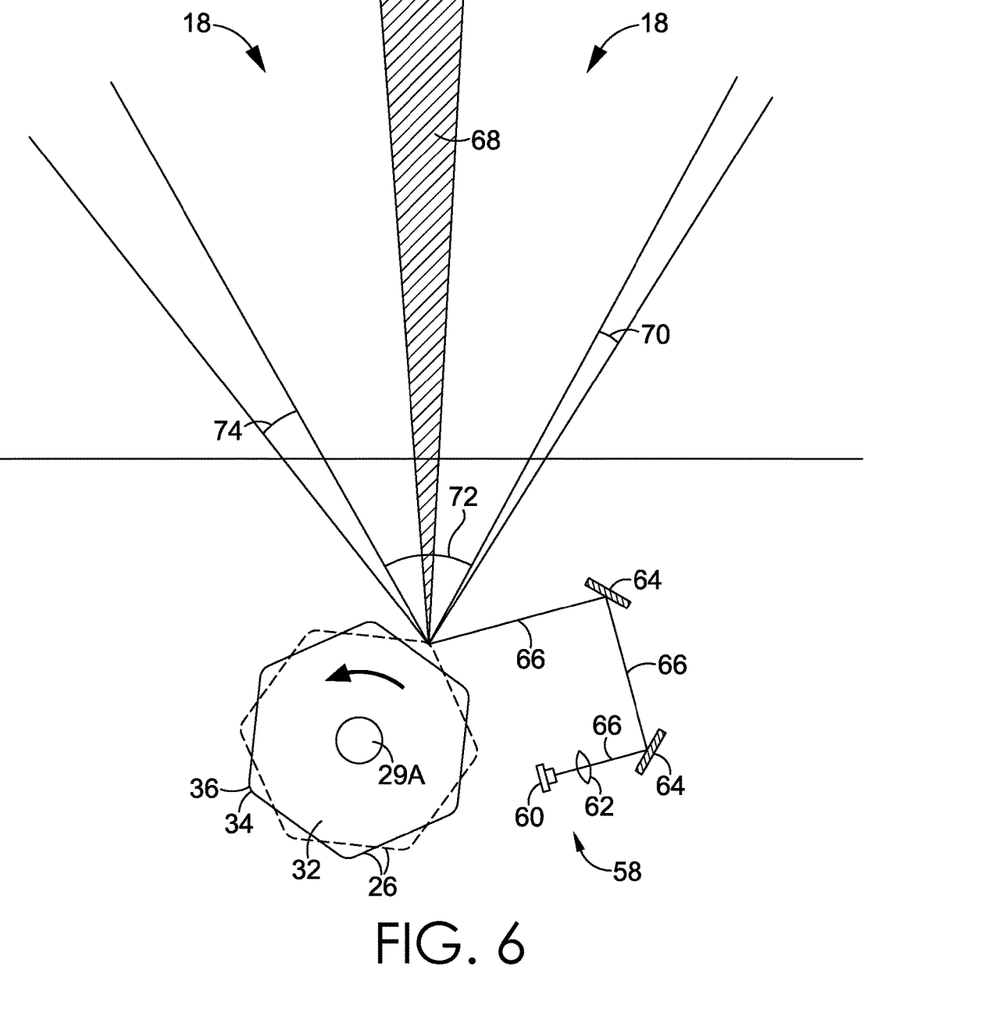
FIG. 6 is an exemplary system incorporating a prismatic polygonal reflector, in accordance with an embodiment of the present invention.

Referring now to FIG. 6, an exemplary system 58 incorporating a prismatic polygonal reflector 32 is provided, in accordance with an embodiment of the present invention. In FIG. 6, the system 58 comprises a light emitting component 60, a lens 62, and multiple reflective surfaces 64 for reflecting light 66 emitted from the light emitting component 60 towards the reflector 32 having aerodynamic intersections 34 and side surfaces 26, which are also shown in FIG. 3. The light emitting component 60 may be a laser or another light emitting source. The lens 62 may be a collimating lens or another type of lens or concentrating optic. The reflective surfaces 64 may be mirrors. It should be noted that an alternate design may not require reflective surfaces 64, and rather, the light 66 may be oriented directly at the reflector 32. Use of reflective surfaces 64 may allow for a more compact design of a scanning device.

As shown in FIG. 6, as the light 66 is emitted from the light emitting component 60, and as the reflector 32 is rotated, the light 66 is reflected off each of the side surfaces 26 of the reflector 32 (reaching the reflector 32 via the reflective surfaces 64). The light 66 is also reflected off of the aerodynamic intersections 34 of the reflector 32 in FIG. 6. Because this reflector 32 does not include the pointed portions 42 shown in FIGS. 4A and 4B from which the light 66 may be exclusively or primarily reflected at the intersections, scattering of the light 66 may occur from the light 66 hitting the aerodynamic contours 36 of the aerodynamic intersections 34. As a result, scattered light 68 is present in the beam of light 18 emitted from the system 58. The scattered light 68 can cause interference with other scanners in close proximity due to improper light reflections being received by the nearby scanners, reducing accuracy and effectiveness of scanning.

In order to reduce or eliminate the scattered light 68, the emittance of the light 66 from the light emitting component 60 may be timed, or rather, sequenced, to prevent or reduce the reflection of the light 66 from the aerodynamic intersections 34. In this respect, the light 66 may be emitted when the light 66 will only be reflected by the side surfaces 26 of the reflector 32, rather than the aerodynamic intersections 34 (some small reflection of light is always possible; timing the emission may merely reduce the scattered light 68 caused by reflection of the light 66 from the aerodynamic intersections 34).

As one example, when the light 66 is going to cross an aerodynamic intersection 34, the light emitting component 60 may shut off, such as at the first angle 70 shown in FIG. 6. The light emitting component 60 may turn on again at a second angle 72 after the aerodynamic intersection 34 has passed in the rotation of the reflector 32, so that the beam of light 18 can be generated by reflecting the light 66 off of a side surface 26. Subsequently, the light emitting component 60 may be shut off at a third angle 74 where another aerodynamic intersection 34 is about to reflect the light 66 from the light emitting component 60. By timing the light 66 from the light emitting component 60 as described, scattered light 68 from the aerodynamic intersections 34 may be reduced or minimized.

Figure 7:
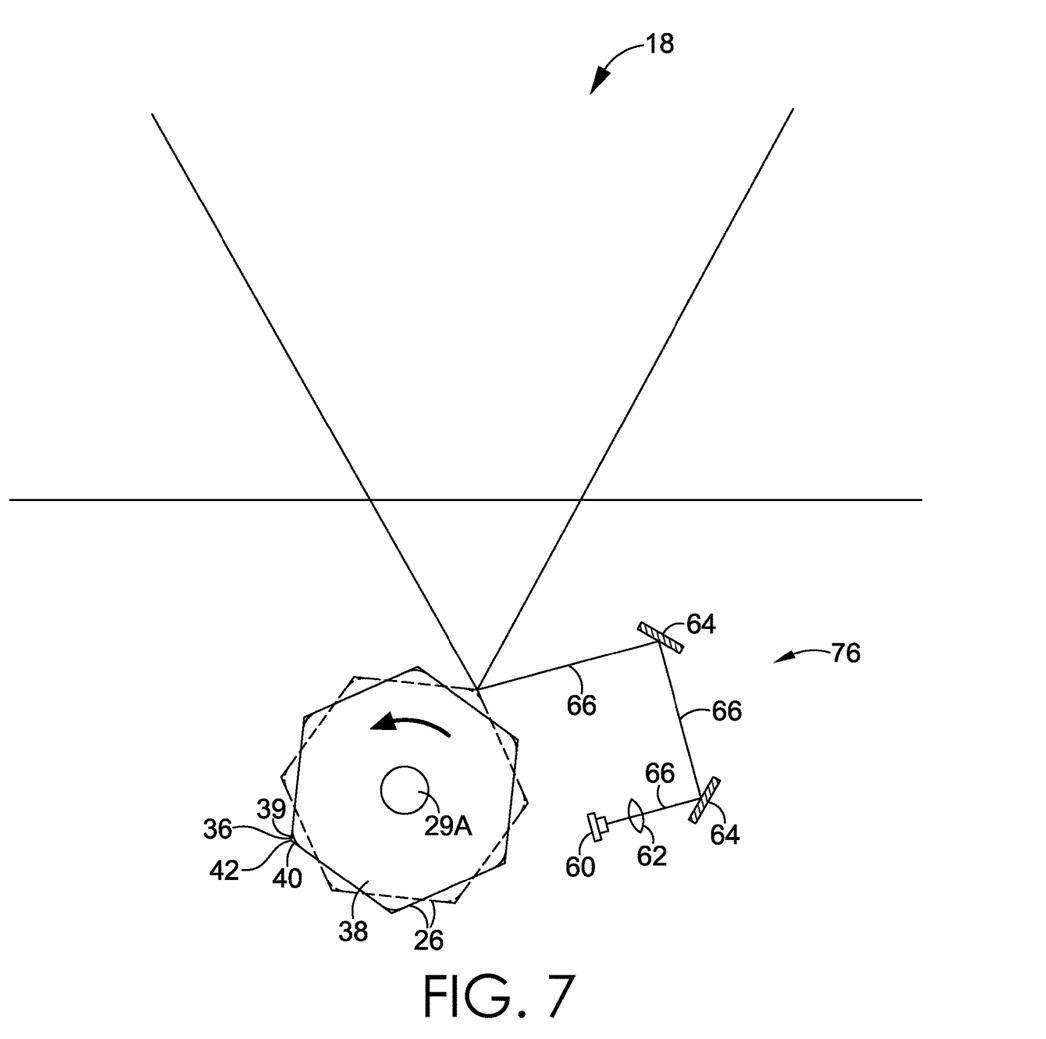
FIG. 7 is an exemplary system incorporating a prismatic polygonal reflector with pointed portions for reduced scattering of reflected light, in accordance with an embodiment of the present invention.

Referring now to FIG. 7, an exemplary system 76 incorporating a reflector 38 with pointed portions 42 for reduced light scattering over intersections 39 is provided, in accordance with an embodiment of the present invention. The reflector 38 in FIG. 7 is the reflector 38 shown in FIGS. 4A and 4B with pointed portions 42 and aerodynamically formed portions 40 on the intersections 39. The aerodynamic contours 36 on the aerodynamically formed portions 40 reduce windage, or rather, wind or air drag over at least a portion of each intersection 39 as the reflector 38 is spinning. The pointed portions 42 reduce scattering of light over the intersections 39.

The light 66 emitted from the light emitting component 60 in FIG. 7 is directed such that it is reflected from the side surfaces 26 of the reflector 38, and also primarily the pointed portions 42 of the intersections 39, as the reflector rotates and exposes the side surfaces 26 and the intersections 39 to the light 66. In this respect, the light 66 is emitted from a position and orientation such that it is directed towards the side surfaces 26 and the pointed portions 42 (minimal light is reflected from the aerodynamically formed portions 40 through axial and angular positioning of the light emitting component 60 relative to the reflector 38). This produces a beam of light 18 with less scattered light than would be the case if the light 66 were reflected from the aerodynamically formed portions 40 on the intersections 39.

Figure 8:
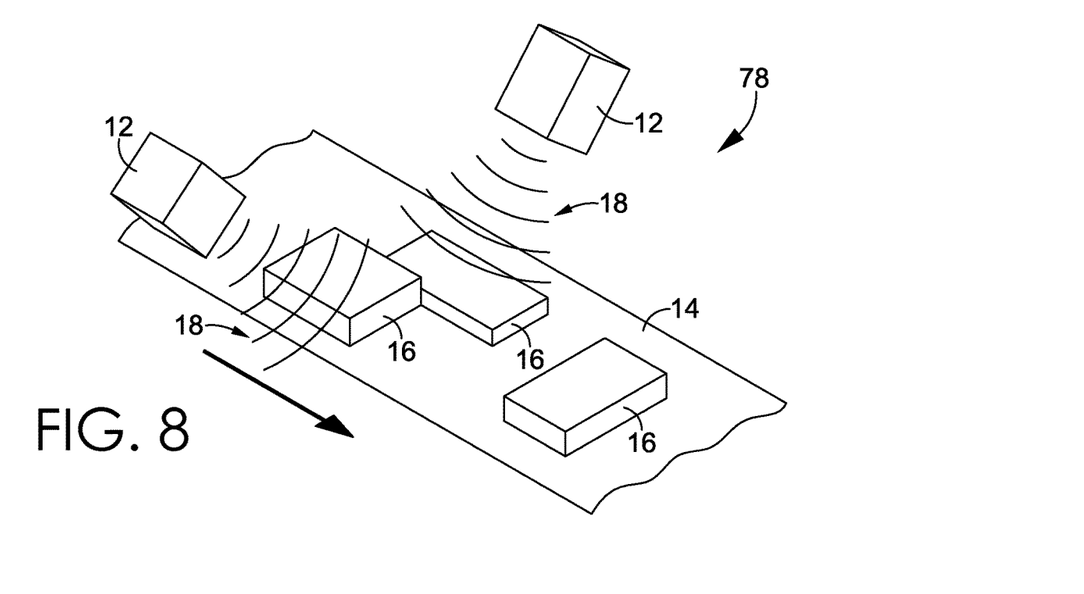
FIG. 8 is an exemplary scanning process utilizing multiple scanners with prismatic polygonal reflectors, in accordance with an embodiment of the present invention.

Referring now to FIG. 8, an exemplary scanning process 78 utilizing multiple scanners 12 with prismatic polygonal reflectors is provided, in accordance with an embodiment of the present invention. In FIG. 8, the close proximity of the scanners 12 means that scattered light 68 from an improper reflection off of the reflectors can cause interference and affect the accuracy or effectiveness of the scanners 12. In this regard, by using the polygonal scanning devices and systems described herein, the amount of scattered light 68 produced by the scanners 12 may be limited. This may permit scanning of multiple packages 16 on the conveyer 14 simultaneously, and also, more accurate scanning of multiple packages 16 that are in close proximity, while reducing light interference between scanners 12. The scanning beams 18 shown in FIG. 8 may be directed from any orientation or position, depending on the desired angles of capture, and amount of scanning angle needed, with reduced interference.

Figure 9:
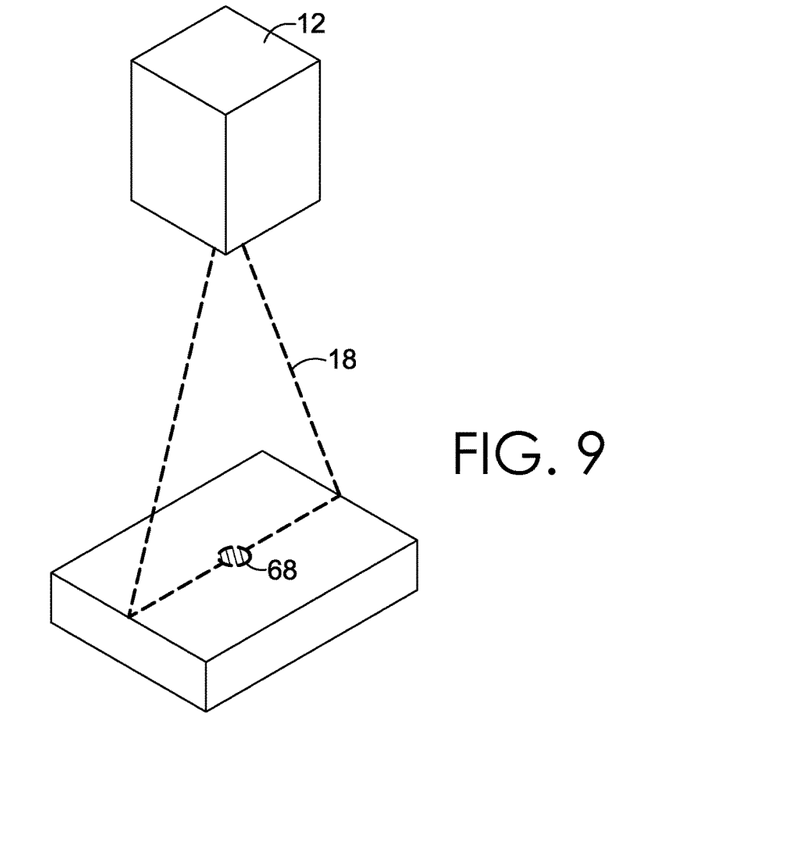
FIG. 9 is an exemplary beam of light generated by a scanner with light scattering occurring, in accordance with an embodiment of the present invention.

Referring now to FIG. 9, an exemplary beam of light 18 generated by a scanner 12 with scattered light 68 occurring is provided, in accordance with an embodiment of the present invention. By utilizing the exemplary scanning system 58 in FIG. 6 or the exemplary scanning system 76 in FIG. 7, the scattered light 68 can be reduced or limited by reducing an amount of undesired reflections from a reflector used within the scanner, such as the reflector 38 shown in FIG. 4A.

Figure 10:
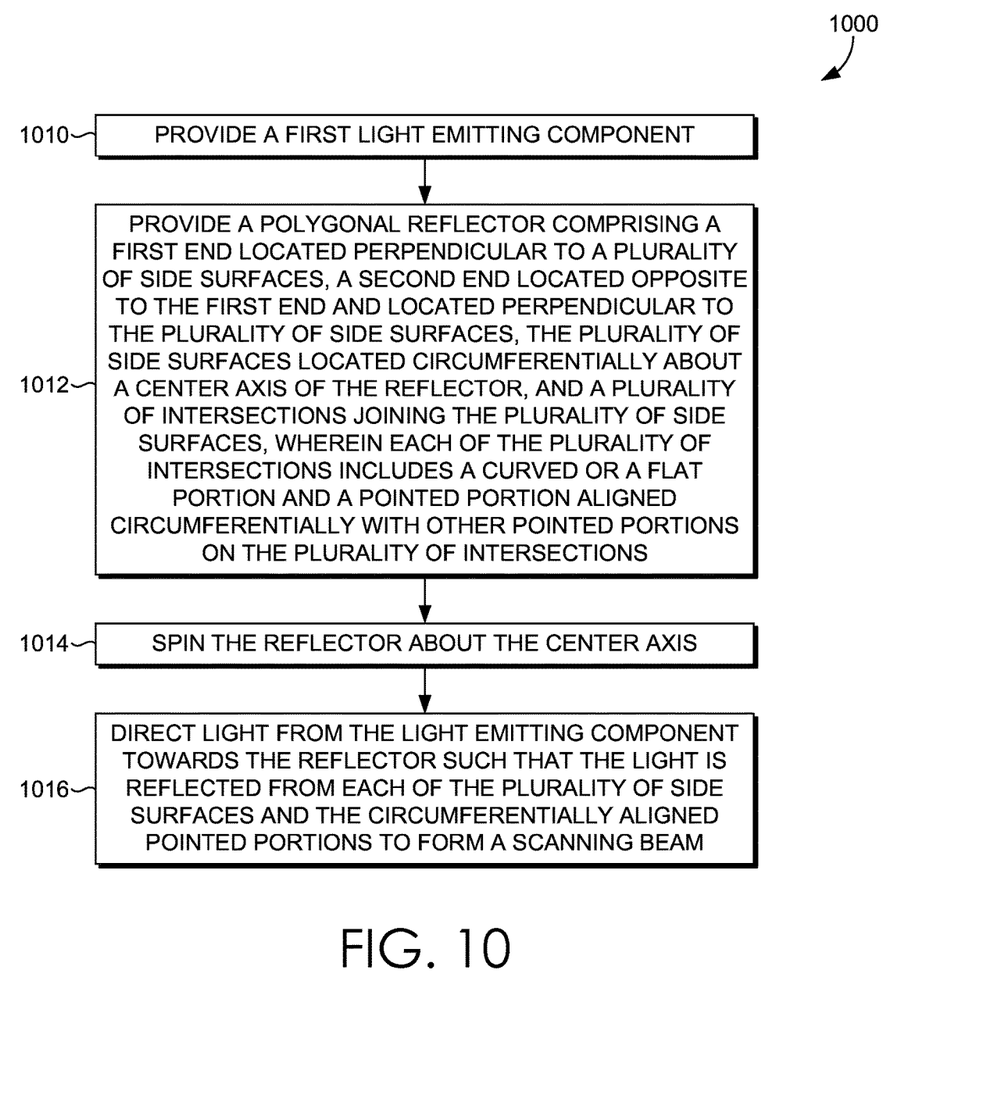
FIG. 10 is a block diagram of an exemplary method for reduced-interference scanning, in accordance with an embodiment of the present invention.

Referring to FIG. 10, a block diagram 1000 of an exemplary method for reduced-interference scanning is provided, in accordance with an embodiment of the present invention. At a first block 1010, a first light emitting component, such as the light emitting component 60 shown in FIG. 7, is provided. At a second block 1012, a polygonal reflector, such as the reflector 38 shown in FIG. 4A, is provided. The polygonal reflector may comprise a first end, such as the first end 22 shown in FIG. 4A, that is located perpendicular to a plurality of side surfaces, such as the side surfaces 26 shown in FIG. 4A, a second end, such as the second end 24 shown in FIG. 4A, located opposite to the first end and located perpendicular to the plurality of side surfaces, the plurality of side surfaces located circumferentially about a center axis of the reflector, such as the center axis 28 shown in FIG. 4A, and a plurality of intersections, such as the intersections 39 shown in FIG. 4A, joining the plurality of side surfaces. Each of the plurality of intersections may include a first curved or flat portion, such as the aerodynamically formed portion 40 shown in FIG. 4A which may be radiused or flat, and a pointed portion, such as the pointed portion 42 shown in FIG. 4B, aligned circumferentially with other pointed portions on the plurality of intersections, such as the circumferentially aligned pointed portions 42 shown around the reflector 38 at the axial position 44 in FIG. 4A.

At a block 1014, the reflector is spun about the center axis. The amount of spin around the center axis can be set, determined, and/or varied based on the desired number of reflections per second from each surface of the reflector, or a desired number of revolutions per second. A possible spinning configuration may be 10 revolutions per second, for example. At a block 1016, light, such as the light 66 shown in FIG. 7, is directed from the light emitting component towards the reflector such that the light is reflected from each of the plurality of side surfaces and the circumferentially aligned pointed portions of each of the plurality of intersections to form a scanning beam. The scanning beam may contain limited reflection of light from the aerodynamically formed portions of each intersection, and primarily reflected light from the pointed portions of the intersections and the side surfaces.

Figure 11:
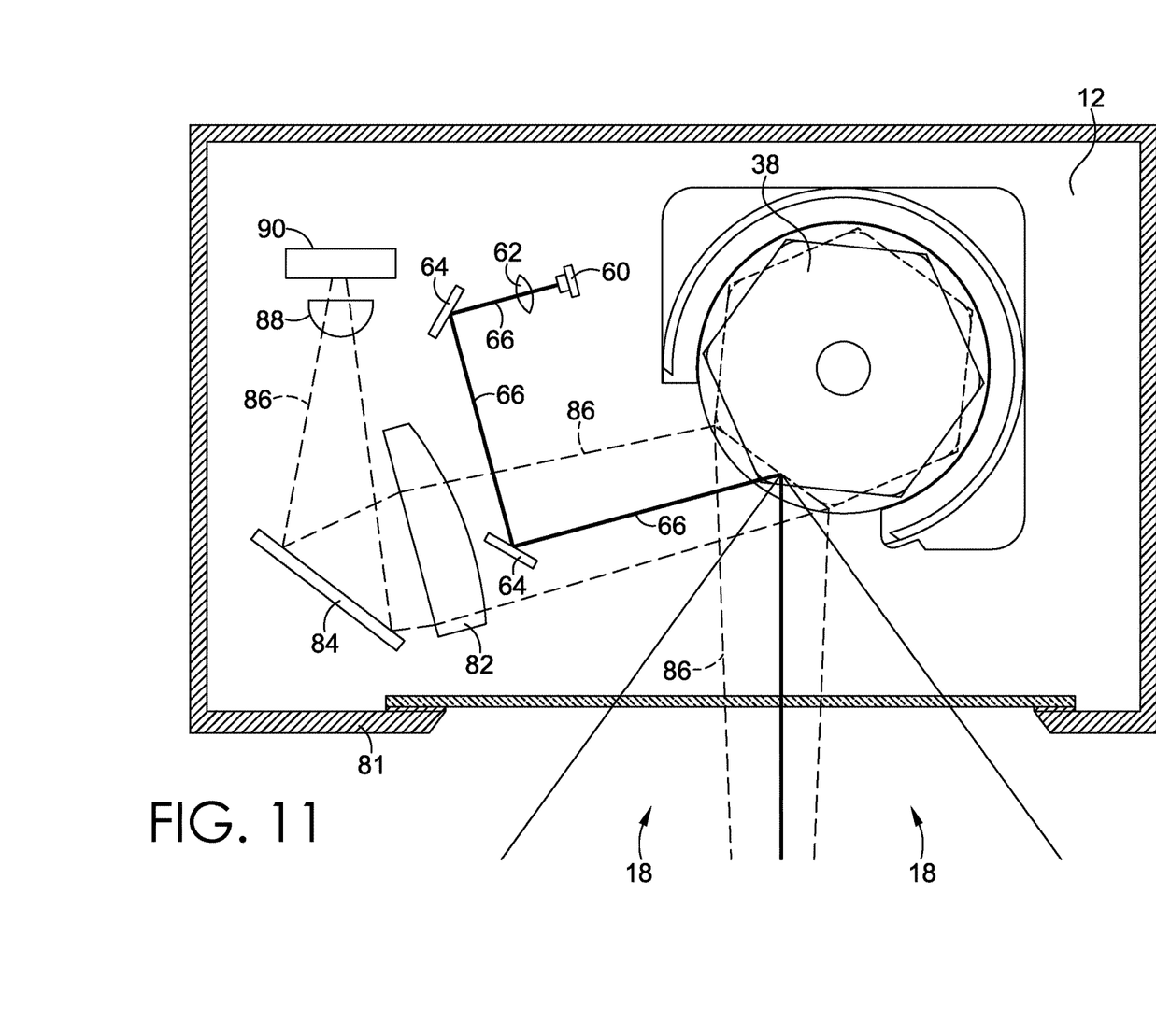
FIG. 11 is an exemplary scanner configuration, in accordance with an embodiment of the present invention.

Referring now to FIG. 11, an exemplary scanning device 12 incorporating a reflector 38 with improved aerodynamic properties and that produces reduced scattering of reflected light is provided, in accordance with an embodiment of the present invention. In FIG. 11, the reflector 38 of FIG. 4A is incorporated into a housing 81 of the scanning device 12. Additionally, the path of light from emission to detection is also shown in FIG. 11.

FIG. 11 depicts the light emitting component 60 sending the light 66 towards the reflector 38 via the reflective surfaces 64. The multi-directional path of the light 66 in the housing 81 allows a more compact design of the scanner 12 due to the possibility of varied placement and orientation of the light emitting component 60. In FIG. 11, the light 66 is reflected from the side surfaces 26 of the reflector 38 and primarily the pointed portions 42 of the intersections 39 as the reflector 38 spins, producing a beam of light 18 with reduced light scattering. In this regard, the light 66 from the light emitting component 60 can be oriented, sized, positioned, and/or aimed such that it substantially avoids the aerodynamically formed portions 40 on the intersections 39 and primarily reflects from the pointed portions 42 on the intersections 39 to reduce or limit light scattering. The aerodynamically formed portions 40 may simply be utilized where possible on the intersections 39 to improve aerodynamic efficiency of the reflector 38 without substantially affecting the beam of light 18.

The returned light 86 is the light 66 reflected from an object and received within the housing 81, where it is concentrated on a first collecting lens 82. The first collecting lens 82 concentrates the returned light 86 and directs it onto a collecting mirror 84 which reflects the returned light 86 towards a second collecting lens 88, where the reflected light 86 is concentrated into a detector 90. The design shown in FIG. 11 is merely exemplary. Different configurations are possible and contemplated.

The reflector described herein may be a scanning mirror with mirrored reflective surfaces. The reflector may have multiple facets with a rectangular shape. The rectangular shape may allow for a better collection aperture for the light. Each intersection may include a double face facet intersection and include, at least partially, a sharp corner, where the sharp corner may be positioned in the center of each facet intersection, and a radiused corner for the remaining part of the respective facet intersection. The radiused and sharp corner implementation may be equal for each facet, and/or aligned longitudinally for each facet intersection.

The reflector may have one of a variety of polygonal constructions. Each of the side surfaces may be square, rectangular, trapezoidal, or another geometric shape. Furthermore, the side surfaces may be arranged about the center axis of the reflector such that they are equal in size and/or have the same geometric shape. Furthermore, the geometric shape may be a square or rectangle that terminates at the first and second ends of the reflector.

The intersections between side surfaces may have different features and geometric configurations. For example, each intersection may include a radiused portion extending from the first end of the reflector to a pointed portion, which may be approximately halfway between the first end and the second end of the reflector. The pointed portion may include a sharp edge, or be extruded from the radiused portion to form a distal end that is sharper, or more abruptly transitional, than the radiused portion. The intersection may generally be rectangular in shape, having a uniform radius, length, and/or width (width may be measured as the distance between adjacent side surfaces). A singular or composite construction of the reflector is contemplated. Additionally, multiple curved or flat portions may be incorporated at different points along the intersection, depending on the number and position of pointed portions that are utilized on the intersection. The reflector may be a hexagonal shape about the center axis, as shown in FIGS. 2, 3, 4A, and 4B, with six side surfaces, and may have mounts at either end of the reflector for attaching the reflector to a machine or device that may spin the reflector during operation of an associated scanner. The device may have any number of side surfaces, such as four, five, or six side surfaces, or another number of side surfaces.

The combination of reduced windage, or rather, increased aerodynamic and thermal performance (e.g., maintaining of temperature) allows scanners of any kind utilizing the reflectors described herein to be mounted in closer proximity to one another with reduced interference from light scattering from one or multiple scanners. This allows for use of multiple scanners in space-limited locations.

Timing the light emitted from the light emitting component for reduction of scattered light may be used separately or in conjunction with the circumferentially aligned pointed portion configuration. In this respect, a possible timing sequence may include the following: light emitting component off during a curved or flat intersection, light emitting component on during a scan across an in-beam sensor, light emitting component off depending on the desired size of scan angle, light emitting component on for a data gathering portion of the scan, light emitting component off depending on the size of the scan angle, light emitting component on during a scan across the phase reference, light emitting component off during a curved or flat portion of the intersection. This sequence may repeat and/or may occur continuously as the reflector is rotated around the center axis.

Additional advantages of the reflectors described herein include closer positioning of scanners, reduced power consumption due to reduced windage, and reduced internal temperature of associated scanners. The formation of the pointed portion on each intersection may be accomplished in a variety of ways. One such method is to begin creating or machining a radius along the intersection, and at a desired position for the pointed portion, withholding from forming or machining of the radius to leave a sharp, pointed, and/or distal end, such as the pointed portion 42 with the distal end 46 shown in FIG. 4B, that is coplanar with each adjacent side surface up to the distal end, and forming or machining the remainder of the intersection to have the radius.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A polygonal reflector comprising:
    a first end located perpendicular to a plurality of side surfaces;
    a second end located opposite to the first end and located perpendicular to the plurality of side surfaces;
    the plurality of side surfaces located circumferentially about a center axis of the polygonal reflector; and
    a plurality of intersections joining the plurality of side surfaces, wherein each intersection of the plurality of intersections includes:
    at least one of a curved and a flat portion, and
    a respective pointed portion aligned circumferentially with other pointed portions on the plurality of intersections,
    wherein the pointed portion of each intersection includes a first side and a second side, wherein the first side is coplanar with a first adjacent side surface, and wherein the second side is coplanar with a second adjacent side surface.

2. The reflector of claim 1, wherein the plurality of side surfaces comprises six polygonal side surfaces that form a hexagonal shape, and wherein the plurality of side surfaces extend from the first end to the second end.

3. The reflector of claim 1, wherein each of wherein each of the plurality of intersections is a uniform width between the first end and the second end.

4. The reflector of claim 1, wherein each intersection of the plurality of intersections includes:
    a first curved or flat portion extending from the first end to the respective pointed portion, and
    a second curved or flat portion extending from the second end to the respective pointed portion,
    wherein the pointed portion extends further radially from the center axis than the first or the second curved or flat portions.

5. The reflector of claim 1, wherein for each intersection of the plurality of intersections, the pointed portion comprises an edge extending along at least a portion of a length of the respective intersection between the first end and the second end, the edge being more pointed than the curved or flat portion of the respective intersection.

6. The reflector of claim 1, wherein each side surface of the plurality of side surfaces is reflective.

7. The reflector of claim 1, wherein each pointed portion is at a midpoint of a respective intersection between the first end and the second end.

8. A scanning system comprising:
    a light emitting component; and
    a polygonal reflector comprising:
    a first end located perpendicular to a plurality of side surfaces;
    a second end located opposite to the first end and located perpendicular to the plurality of side surfaces;
    the plurality of side surfaces located circumferentially about a center axis of the polygonal reflector; and
    a plurality of intersections joining the plurality of side surfaces, wherein each intersection of the plurality of intersections includes:
    at least one of a curved and a flat portion; and
    a respective pointed portion aligned circumferentially with other pointed portions on the plurality of intersections,
    wherein the pointed portion of each intersection includes a first side and a second side, wherein the first side is coplanar with a first adjacent side surface, and wherein the second side is coplanar with a second adjacent side surface.

9. The system of claim 8, wherein, when light is emitted from the light emitting component and directed towards the polygonal reflector, and when the polygonal reflector is rotating about the center axis, the light is reflected from each of the plurality of side surfaces and each of the circumferentially aligned pointed portions, forming a scanning beam.

10. The system of claim 8, wherein each curved or flat portion comprises a uniform width.

11. The system of claim 8, wherein the polygonal reflector comprises six side surfaces that form a hexagonal shape about the center axis.

12. The system of claim 8, wherein each intersection of the plurality of intersections is a constant width between the first end and the second end.

13. The system of claim 8, wherein each side surface of the plurality of side surfaces comprises a mirrored surface.

14. The system of claim 8, further comprising one or more lenses positioned such that at least a portion of light emitted from the light emitting component passes through the one or more lenses prior to reaching the polygonal reflector.

15. The system of claim 9, further comprising a conveyer, wherein the scanning beam is at least partially directed towards the conveyer, and wherein the scanning beam provides dimensional scanning of objects on the conveyer.

16. A method for reduced-interference scanning comprising:
    providing a first light emitting component;
    providing a polygonal reflector comprising:
    a first end located perpendicular to a plurality of side surfaces;
    a second end located opposite to the first end and located perpendicular to the plurality of side surfaces;
    the plurality of side surfaces located circumferentially about a center axis of the polygonal reflector; and a plurality of intersections joining the plurality of side surfaces, wherein each intersection of the plurality of intersections includes:
at least one of a curved and a flat portion, and
a respective pointed portion aligned circumferentially with other pointed portions on the plurality of intersections,
wherein the pointed portion of each intersection includes a first side and a second side, wherein the first side is coplanar with a first adjacent side surface,
and wherein the second side is coplanar with a second adjacent side surface;
spinning the polygonal reflector about the center axis; and
directing light from the light emitting component towards the polygonal reflector to form a scanning beam.

17. The method of claim 16, wherein each intersection of the plurality of intersections comprises a uniform width.

18. The method of claim 16, wherein the polygonal reflector comprises six side surfaces that form a hexagonal shape about the center axis.

\* \* \* \* \*